United States Patent
Ursin et al.

(10) Patent No.: US 9,900,554 B2
(45) Date of Patent: Feb. 20, 2018

(54) METHODS, SYSTEMS, AND COMPUTER READABLE MEDIA FOR AUTOMATICALLY ADDING INDIVIDUALS AND PHYSICAL CONFERENCE ROOMS TO CONFERENCES IN VIRTUAL CONFERENCE ROOMS

(71) Applicant: BroadSoft, Inc, Gaithersburg, MD (US)

(72) Inventors: Markku Tapio Ursin, Espoo (FI); Petri Sebastian Somerkari, Helsinki (FI); Eva-Marie Alice Wallinvirta, Päivölä (FI); Gregory Eugene Pounds, San Jose, CA (US)

(73) Assignee: BROADSOFT, INC., Gaithersburg, MD (US)

( * ) Notice: Subject to any disclaimer, the term of this patent is extended or adjusted under 35 U.S.C. 154(b) by 0 days.

(21) Appl. No.: 14/846,684

(22) Filed: Sep. 4, 2015

(65) Prior Publication Data
US 2017/0070706 A1    Mar. 9, 2017

(51) Int. Cl.
*H04N 7/14* (2006.01)
*H04N 7/15* (2006.01)
*H04L 12/18* (2006.01)

(52) U.S. Cl.
CPC ......... *H04N 7/157* (2013.01); *H04L 12/1822* (2013.01)

(58) Field of Classification Search
USPC ........................................... 348/14.01–14.09
See application file for complete search history.

(56) References Cited

U.S. PATENT DOCUMENTS 5,999,208 A * 12/1999 McNerney ............ H04N 7/147
                                                                                   348/14.03
8,611,521 B2    12/2013 Aldrey et al.
(Continued)

FOREIGN PATENT DOCUMENTS

KR    10-2014-0003150    1/2014

OTHER PUBLICATIONS

"BroadSoft Announces UC One," BroadSoft Press Release, http://www.broadsoft.com/news/broadsoft-announces-uc-one/, pp. 1-5 (Oct. 22, 2012).
(Continued)

*Primary Examiner* — Maria El-Zoobi
(74) *Attorney, Agent, or Firm* — Jenkins, Wilson, Taylor & Hunt, P.A.

(57) ABSTRACT

A method for automatically adding individuals and physical conference rooms to conferences in virtual conference rooms includes providing a communicator application through which a host can add one or more individuals and/or one or more physical conference rooms to a conference in a virtual conference room. A meeting room application through which individuals and physical conference rooms can be automatically joined to the conference in the virtual conference room is also provided. The method further includes receiving, via the communicator application, input from the host to add one or more of the individuals and/or one or more of the physical conference rooms to the conference in the virtual conference room. The method further includes signaling, via one or more media servers, to join the one or more individuals and/or the one or more physical conference rooms to the conference in the virtual conference room. The one or more individuals and/or the one or more physical conference rooms are joined to the conference in the virtual conference room without requiring interaction (Continued)

between the individuals and/or the physical conference room and the meeting room application.

16 Claims, 14 Drawing Sheets

(56) References Cited

U.S. PATENT DOCUMENTS

| 8,762,870 | B2 | 6/2014 | Robotham et al. |
| 2010/0246448 | A1* | 9/2010 | Krantz ................ H04L 12/1818 370/260 |
| 2010/0246571 | A1* | 9/2010 | Geppert .............. G06F 3/04817 370/352 |
| 2010/0251142 | A1 | 9/2010 | Geppert et al. |
| 2011/0270933 | A1 | 11/2011 | Jones et al. |
| 2011/0271332 | A1* | 11/2011 | Jones ................... H04L 9/3247 726/7 |
| 2012/0147123 | A1 | 6/2012 | Lian et al. |
| 2012/0166534 | A1* | 6/2012 | Bentley ............... H04L 12/1822 709/204 |
| 2013/0314491 | A1 | 11/2013 | Vivekanandan et al. |
| 2014/0313282 | A1 | 10/2014 | Ma et al. |
| 2015/0081806 | A1* | 3/2015 | Kanuturi ............ G06Q 10/1095 709/206 |

OTHER PUBLICATIONS

"BroadSoft UC-One," Product Data Sheet, http://www.broadsoft.com/wp-content/uploads/2015/01/broadsoft-uc-one-data-sheet-120214.pdf, pp. 1-2 (publication date unknown; prior to Sep. 4, 2015).

International Search Report and Written Opinion of the International Searching Authority for International Application No. PCT/US2016/013825 (May 20, 2016).

* cited by examiner

METHODS, SYSTEMS, AND COMPUTER READABLE MEDIA FOR AUTOMATICALLY ADDING INDIVIDUALS AND PHYSICAL CONFERENCE ROOMS TO CONFERENCES IN VIRTUAL CONFERENCE ROOMS

TECHNICAL FIELD

The subject matter described herein relates to multimedia conferencing. More particularly, the subject matter described herein relates to methods, systems, and computer readable media for automatically adding individuals and physical conference rooms to conferences in virtual conference rooms.

BACKGROUND

Multimedia conferencing allows users located in geographically diverse locations to communicate with each other without the necessity of travel to a common location. In its simplest form, multimedia conferencing can involve all users dialing in via a telephone or a software interface to a conference bridge and communicating using audio and/or video via the conference bridge. More sophisticated conferencing systems also enable users to participate in document and/or screen sharing sessions during a video and/or audio conference.

One problem with at least some existing multimedia conferencing systems is the requirement of detailed actions on the part of the conference invitee to connect to a multimedia conference. For example, invitees in a physical conference room that are invited to a host's conference typically must interact with conferencing hardware and/or software to connect the physical conference room to the conference. Such interaction can involve multiple steps and complex user interfaces. Often, the invitee is unable to connect to the conference due to a lack of experience and/or complexity of the invitee user interface.

Accordingly, in light of these difficulties, there exists a need for methods, systems, and computer readable media for automatically adding individuals and physical conference rooms to conferences in virtual conference rooms.

SUMMARY

A method for automatically adding individuals and physical conference rooms to conferences in virtual conference rooms includes providing a communicator application through which a host can add individuals and physical conference rooms to a conference in a virtual conference room. One or more meeting room application instances through which individuals and physical conference rooms can be automatically joined to the conference in the virtual conference room is also provided. The method further includes receiving, via the communicator application, input from the host to add one or more of the individuals and/or one or more of the physical conference rooms to the conference in the virtual conference room. The method further includes signaling, via one or more media servers, to join the one or more individuals and/or the one or more physical conference rooms to the conference in the virtual conference room. The one or more individuals and/or the one or more physical conference rooms are joined to the conference in the virtual conference room without requiring interaction between the one or more individuals and/or the one or more physical conference rooms and the one or more meeting room application instances.

According to another aspect of the subject matter described herein, the meeting room application can also be integrated with an existing calendaring system enabling easy joining pre-booked meetings from the meeting room application.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
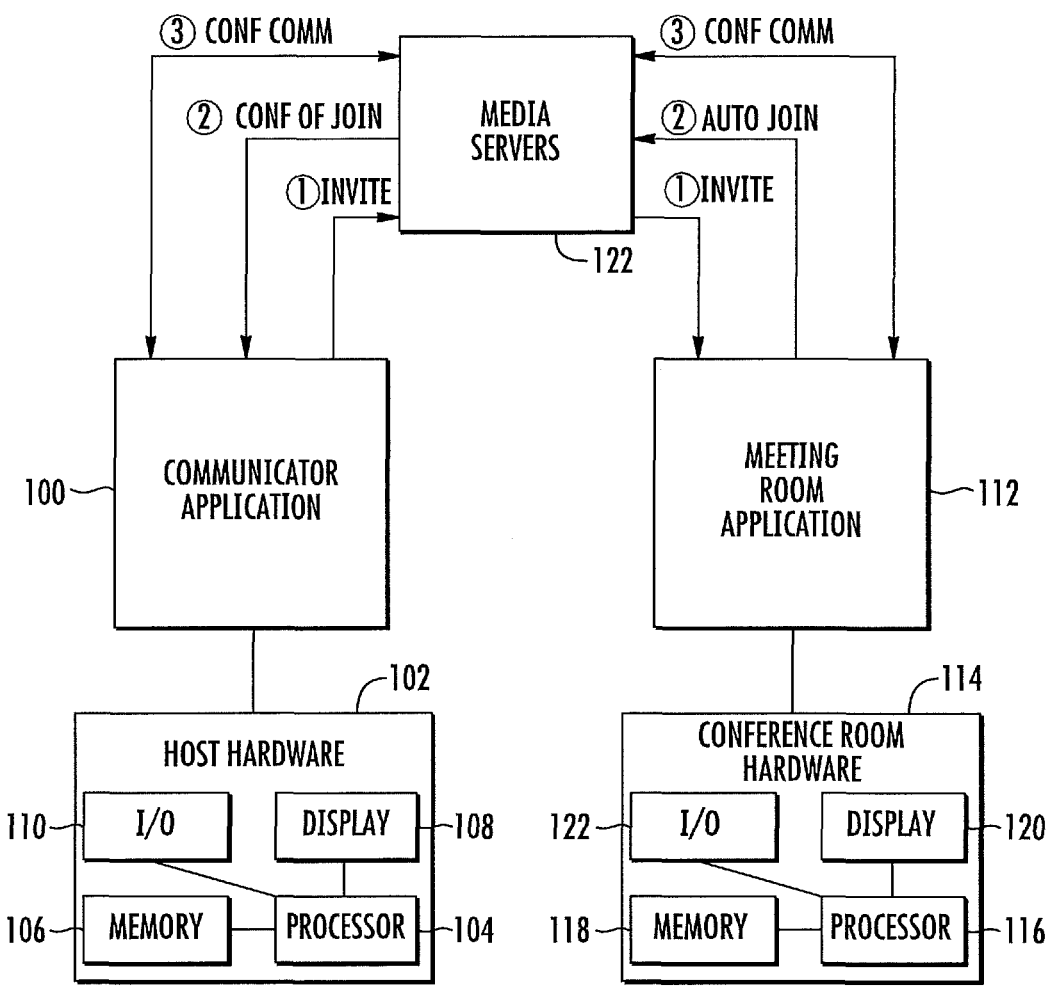
FIG. 1 is a block diagram illustrating an exemplary system for adding individuals and physical conference rooms to conferences in virtual conference rooms according to an embodiment of the subject matter described herein.

The subject matter described herein relates to methods, systems, and computer readable media for automatically adding individuals and physical conference rooms to conferences in virtual conference rooms. FIG. 1 is a block diagram illustrating exemplary components of a system for implementing the subject matter described herein. Referring to FIG. 1, a communicator application 100 executes on host hardware 102 to allow a host user to invite other users, including an entire physical conference room of other users, to a virtual conference room of the host. Host hardware 102 may be any suitable computing platform accessible by the host on which communicator application 100 can execute. In the illustrated example, host hardware includes a processor 104, memory 106, a display 108, and one or more I/O interfaces 110. In one example, host hardware 102 comprises a personal computer, such as a laptop computer, a tablet computer, a smart phone or a desktop computer of the host. Host hardware 102 may also include one or more cameras to support video conferencing.

The system in FIG. 1 further includes a meeting room application 112 that executes on conference room hardware 114. Meeting room application 112 allows individuals and physical conference rooms to be joined automatically to conferences in a host's virtual conference room. Each individual and/or physical conference room for which it is desirable to have automatic conference joining capabilities may be provided with an instance of meeting room application 112. Conference room hardware 114 may also include a processor 116, memory 118, a display 120, and one or more I/O interfaces 122. Conference room hardware 114 may be any suitable computing platform with I/O interfaces for supporting audio and/or video conferencing. In one example, conference room hardware 114 comprises a desktop computer, one or more video cameras, and an associated projector or display for allowing participants in a physical conference room to participate in a conference. If a conference invitee is an individual, rather than a conference room, conference room hardware 114 may be considered conference invitee hardware, which includes the same or similar components. The term "conference invitee hardware" is intended to include any suitable computing platform, whether in or outside of a conference room, on which an instance of meeting room application 112 can execute.

When a host seeks to invite a physical conference room or an individual to join a conference in a virtual conference room of the host, the host provides input to this effect via communicator application 100. Communicator application 100 initiates signaling with one or more media servers 124 to automatically join the individual or physical conference room to the conference. Media servers 124 may include voice over IP servers, video conferencing servers, web servers that allow screen and/or document sharing, etc. The signaling between media servers 124 and meeting room application 112 is transparent to the end users in the physical conference room. The end users in the physical conference room may be automatically joined to the conference without requiring the end users to interact with meeting room application 112, thus simplifying the process of joining the conference and reducing the likelihood of error. Once the end users are joined to the conference, conference communications between attendees occur through media servers 124.

Figure 2A:
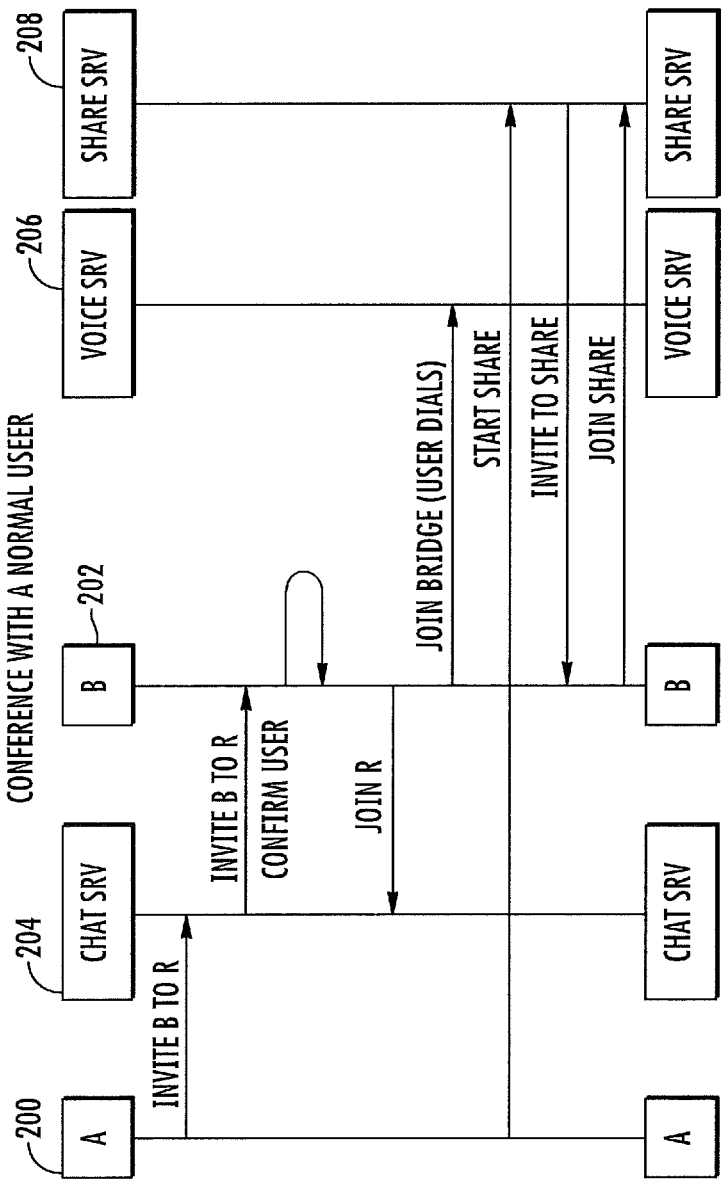
FIG. 2A is a message flow diagram illustrating steps for manually joining a conference.

FIG. 2A is a message flow diagram illustrating exemplary steps for joining a conference using an existing conferencing software interface. Referring to FIG. 2A, user A 200 initially seeks to add user B 202 to a chat session. User A 200 invites user B 202 to the chat session R by instructing the conferencing software to send signaling to a chat server 204. Chat server 204 sends an invitation to invite user B 202 to the chat session or conference R. User B 202 joins the chat conference by typing the appropriate commands or selecting the appropriate buttons in the conferencing user interface of user B's computer and joins the chat conference.

If the conference is also an audio conference, user B 202 dials a directory number, e.g., using a click to call button associated with the conferencing software interface, associated with a conference bridge provided by a voice server 206. User A may wish to share User A's screen with user B during the conference. Accordingly, user A 200 invokes the conferencing software interface to initiate contact with a screen sharing server 208. Screen sharing server 208 signals with user B 202 to allow user B 202 to join the screen sharing session. Depending on the implementation, user B 202 may be required to accept the screen sharing session from user A. Thus, using the steps illustrated in FIG. 2A, user B 202, the invitee, is required to interface with conferencing software at least three times: 1) to join the chat session, 2) to dial the conference bridge number, and 3) to accept the screen sharing session. Such manual steps are inefficient and likely to result in failure of user B 202 to join one or more aspects of the conference.

Figure 2B:
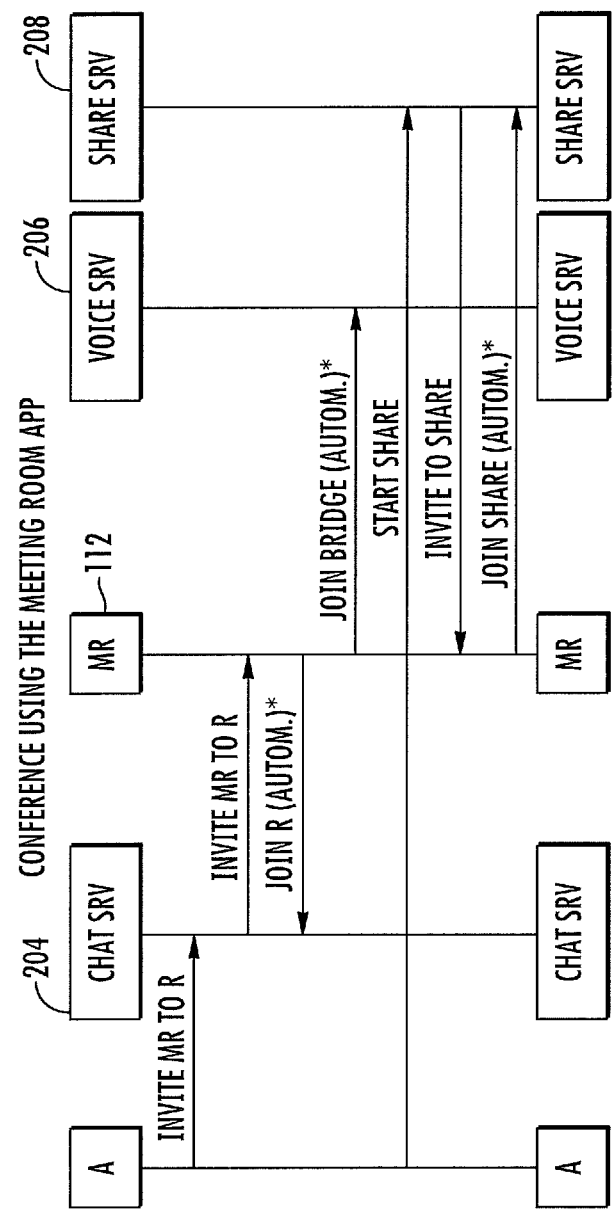
FIG. 2B is a message flow diagram illustrating exemplary steps for automatically joining or adding a physical conference room to a conference in a virtual conference room according to an embodiment of the subject matter described herein.

FIG. 2B illustrates exemplary steps through which communicator application 100 and meeting room application 112 automatically join user B 202 to chat, audio, and screen sharing sessions. Referring to FIG. 2B, user A 200, via communicator application 100, invites a user of meeting room application 112 to join a chat session. Such an invitation causes chat server 204 to invite meeting room application 112 to join the conference. Meeting room application 112 joins the conference automatically without requiring invitees to interact with meeting room application 112. Meeting room application 112 also joins the conference bridge automatically, i.e., without requiring the invitees to dial the conference bridge directory number or even answer an incoming call. Meeting room application 112 initiates signaling with voice server 206 for the audio session and with share server 208 for the screen sharing session. Using the steps illustrated in FIG. 2B, a physical conference room can be automatically added into a chat, audio, and screen sharing session without requiring conference invitees in the physical conference room to interact with meeting room application 112. Such a process can be contrasted with the process illustrated in FIG. 2A where multiple interactions between the invitees and conference room software and/or hardware are required.

Figure 3A:
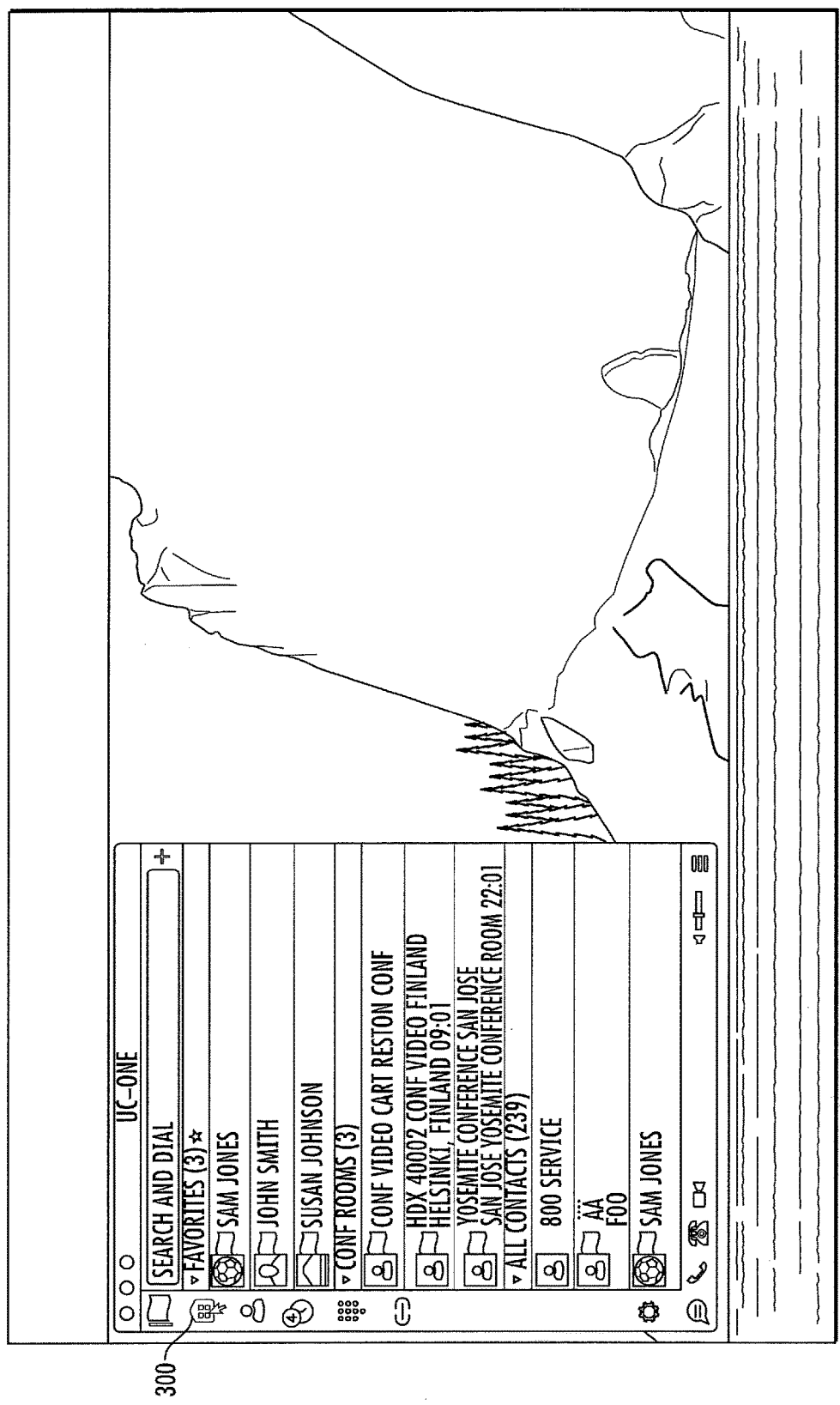
FIG. 3A is a drawing of a computer screen shot illustrating a host interface provided by the communicator application to create a virtual conference room.
Figure 3B:
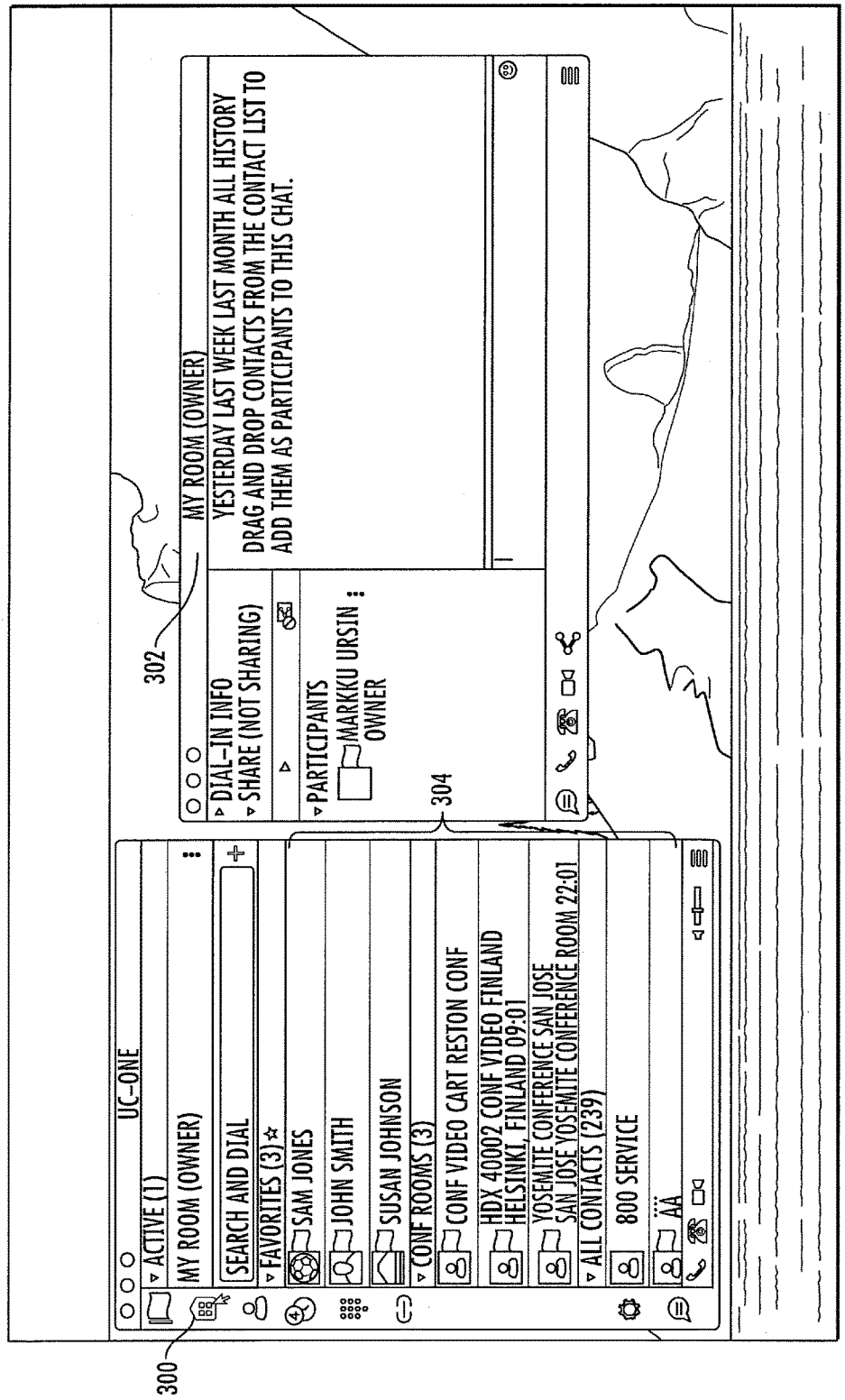
FIG. 3B is a drawing of a computer screen shot illustrating a virtual conference room and an interface through which the host can add physical conference rooms to a conference in the virtual conference room.
Figure 3C:
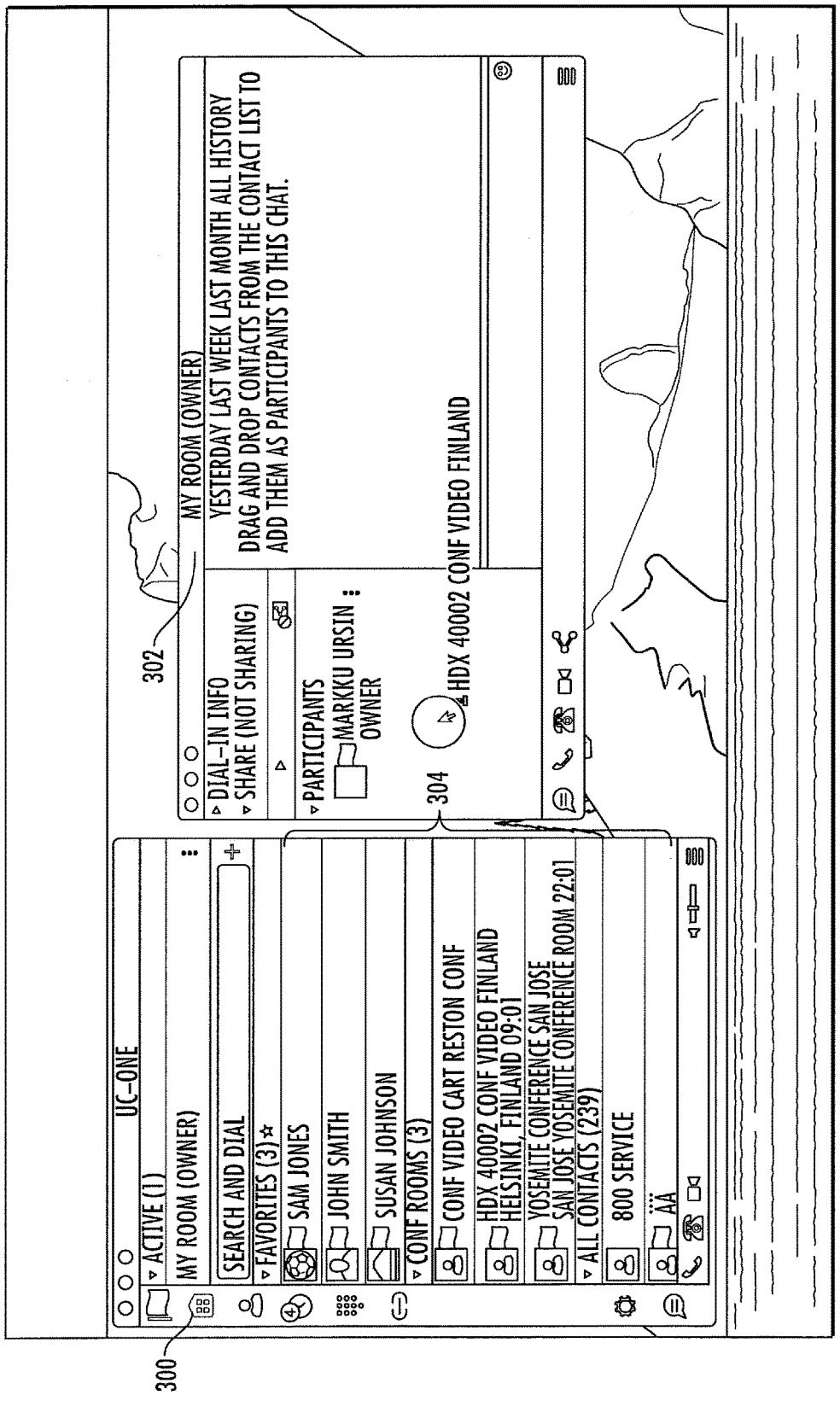
FIG. 3C is a drawing of a computer screen shot illustrating the act of adding a physical conference room from a contact list to a conference in a virtual conference room.

FIG. 3A is a drawing of a user interface that may be provided by communicator application 100 to allow a host to automatically join others to a conference. In FIG. 3A, when the host clicks on a My Room icon 300, a graphical representation of the host's virtual conference room or My Room is displayed, as illustrated in FIG. 3B. Referring to FIG. 3B, box 302 is a graphical representation of the host's virtual conference room. In order to add or invite other users to the virtual conference room, the host can drag and drop contacts from the host's contact list 304 into the virtual conference room graphical indicator 302. It should be noted that contact list 304 includes both individual contacts, e.g., "John Smith", and physical conference rooms, e.g., "HDX 40002 CONF VIDEO FINLAND". FIG. 3C illustrates the act of the host dragging a contact, "HDX 40002 CONF VIDEO FINLAND" into virtual conference room graphical indicator 302. Thus, one aspect of the subject matter described herein includes a graphical interface for automatically adding a physical conference room to a conference using a virtual conference room.

Although drag and drop is shown for illustrative purposes in FIG. 3C, the subject matter described herein is not limited to using a drag and drop user interface to add a user to a virtual conference room. In another example, a host may select conference invitees from a pull down list by clicking on the desired conference invitees in the list. Any suitable method for graphically and/or textually selecting conference room invitees is intended to be within the scope of the subject matter described herein.

Figure 3D:
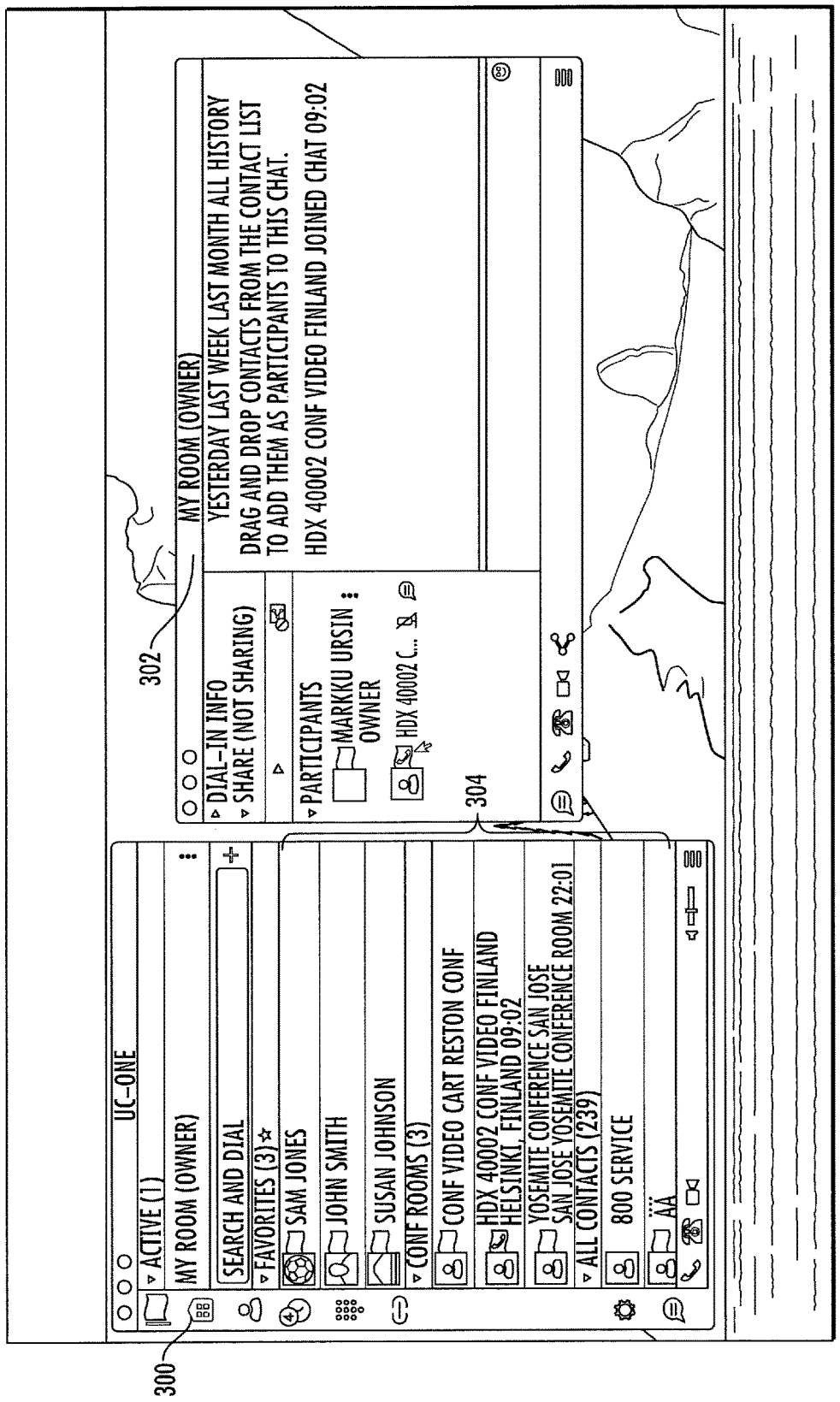
FIG. 3D is a drawing of a computer screen shot illustrating the state of the virtual conference room after the host has added the physical conference room from the host's contact list to the conference.
Figure 3E:
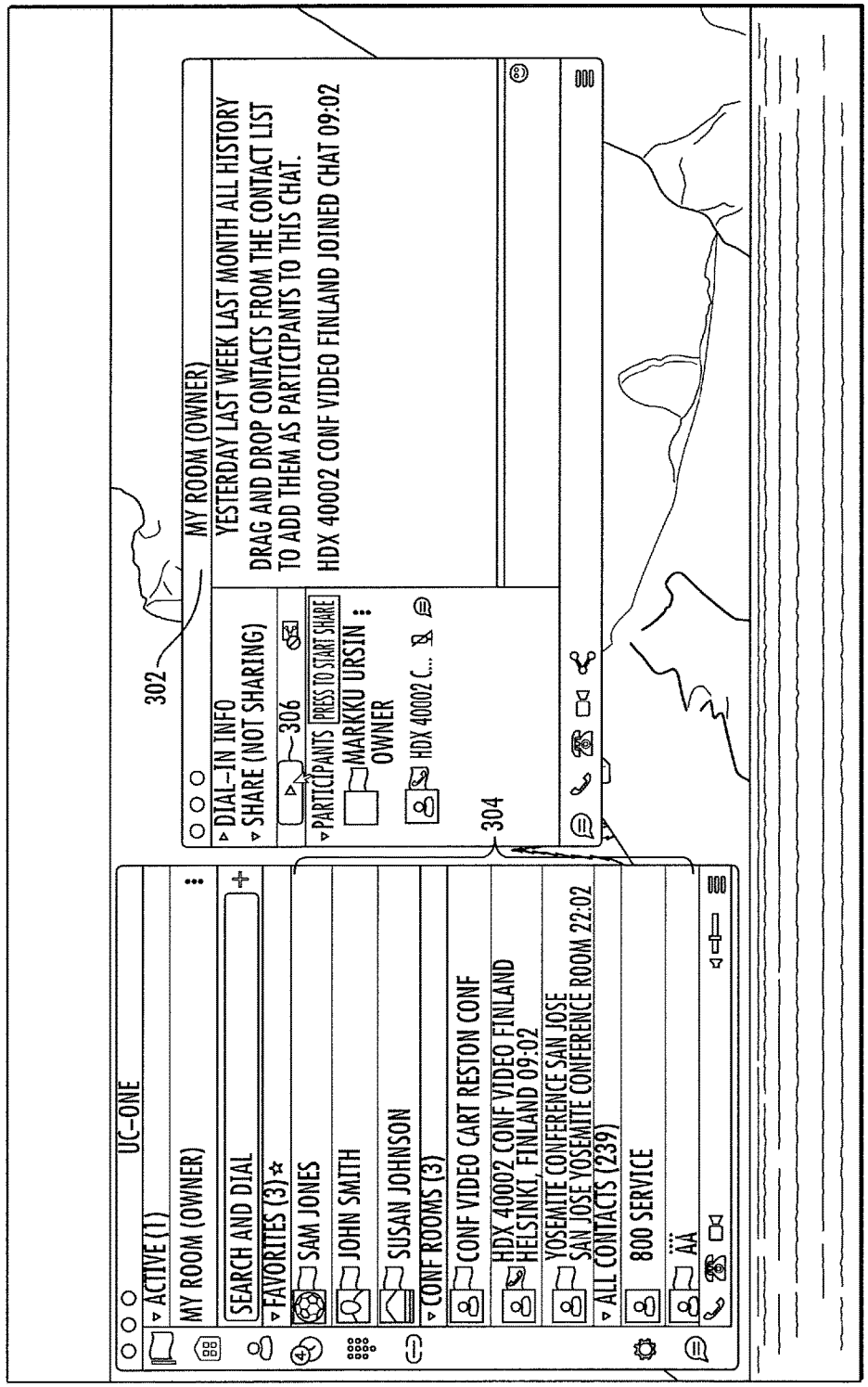
FIG. 3E is a drawing of a computer screen shot illustrating an exemplary host action for initiating sharing of the host's computer screen in the virtual conference room.

In FIG. 3D, when the contact has been dragged and dropped into the virtual conference room graphical indicator 302, the invitee is automatically added to a conference in the virtual conference room. As described above, automatically adding users to the conference may include invoking signaling with media servers 124 depending on the type of conference desired. One type of conference that may be desired is a screen sharing session. In FIG. 3E, the host can invoke a screen sharing session by clicking on button 306 in virtual conference room graphical indicator 302 to initiated signaling with a screen sharing server to add participants in the physical conference room to a screen sharing session.

Figure 4A:
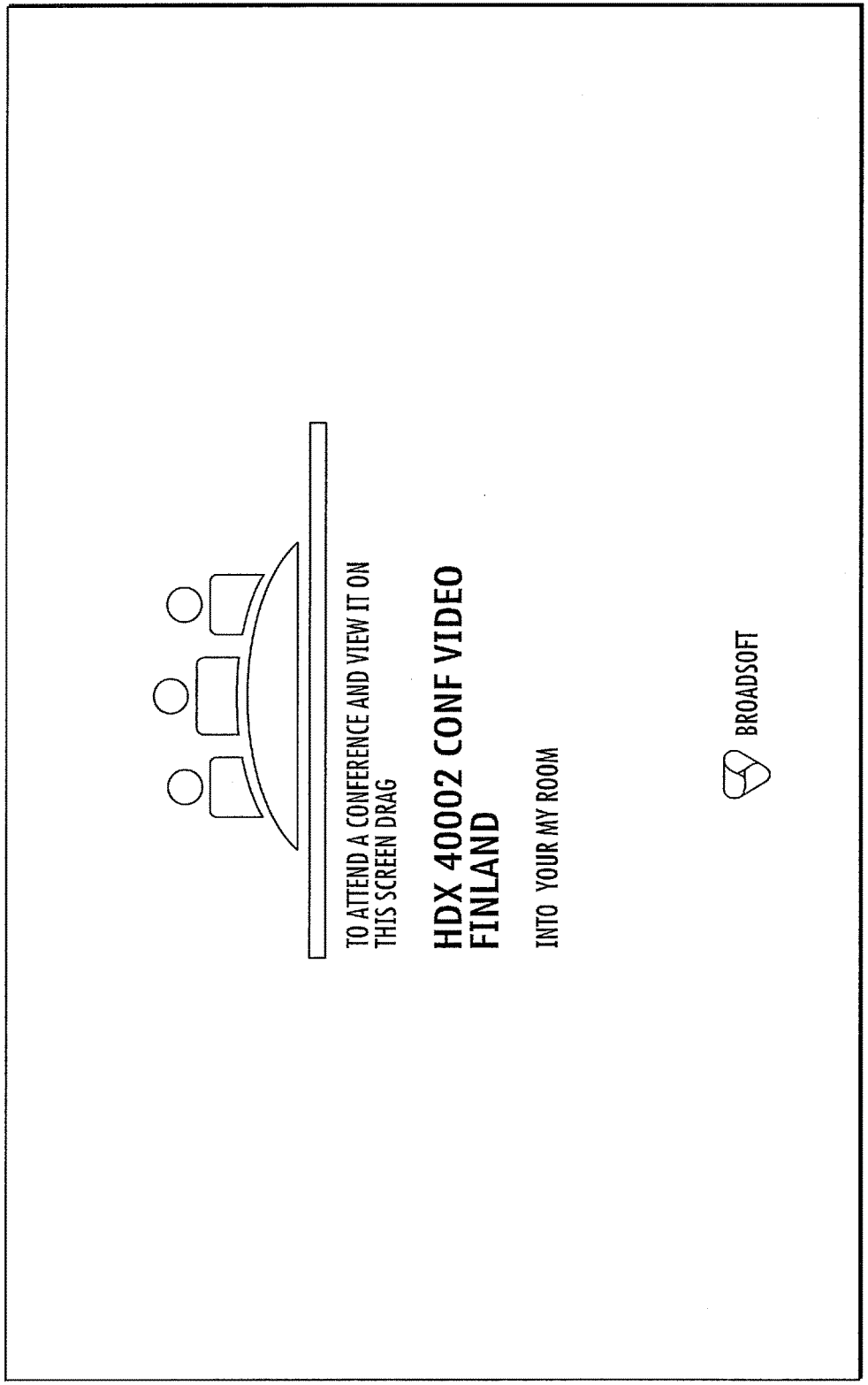
FIG. 4A is a drawing of a computer screen shot illustrating an interface that may be displayed by a meeting room application instance prior to the initiation of a conference.
Figure 4B:
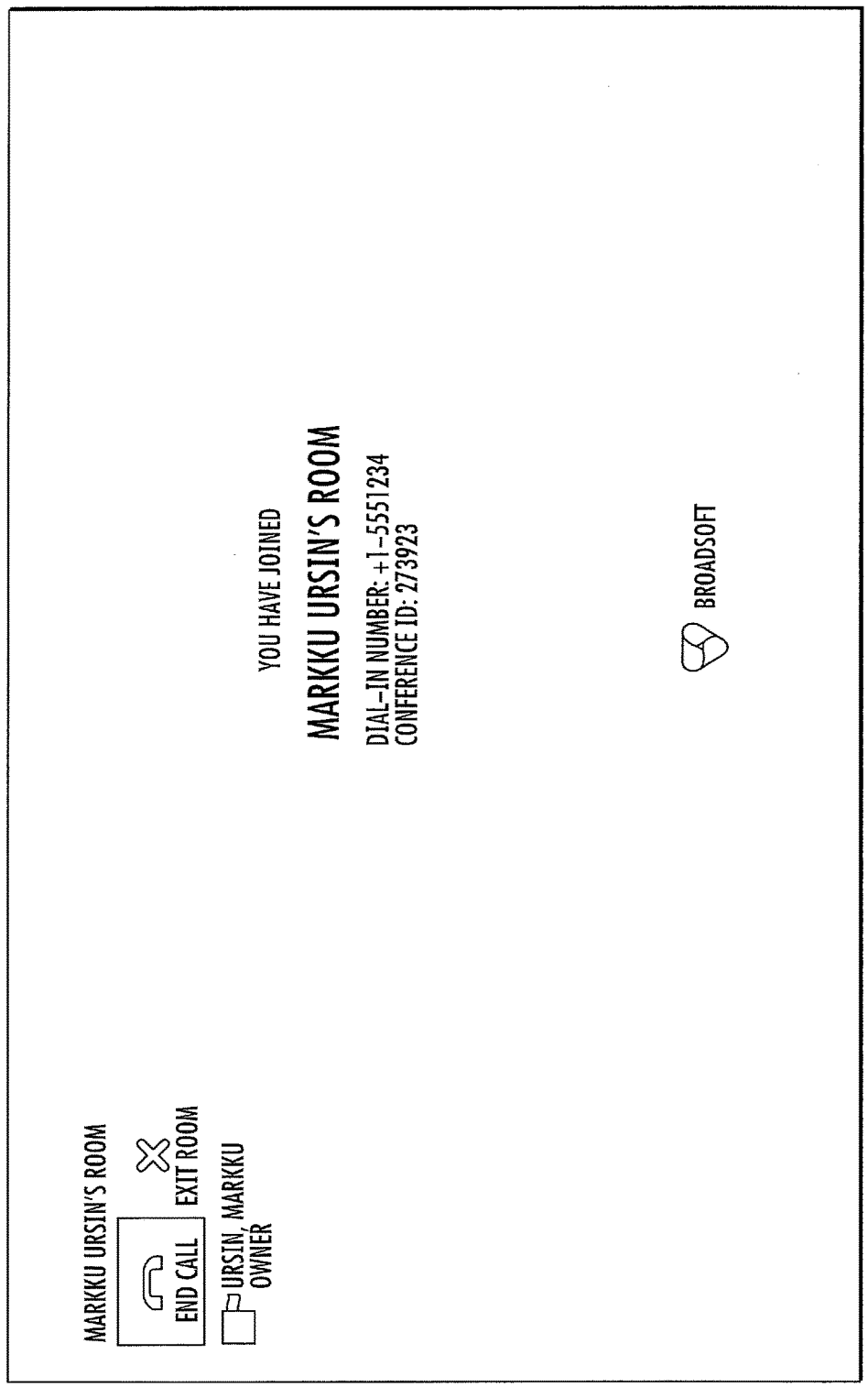
FIG. 4B is a drawing of a computer screen shot illustrating an interface provided by the meeting room application instance after the physical conference room has been added to a conference in a virtual conference room.

FIGS. 4A-4E illustrate exemplary screens that may be provided by a meeting room application 112 to users in a physical conference room that are invited to automatically join a conference. Referring to FIG. 4A, the initial screen that the users in a physical conference room see may include a representation with instructions of how to function as a host and initiate a conference. However, as illustrated in FIG. 4B, when the physical conference room is invited to a conference, meeting room application 112 automatically joins the physical conference room with the conference and displays the screen illustrated in FIG. 4B, indicating that the user has been joined to a conference. In FIG. 4B, the buttons in the top left corner of the user interface allow the user to end the call or exit the conference room. However, no interaction between meeting room application 112 and the conference invitees is required for the invitees to join the conference.

Figure 4C:
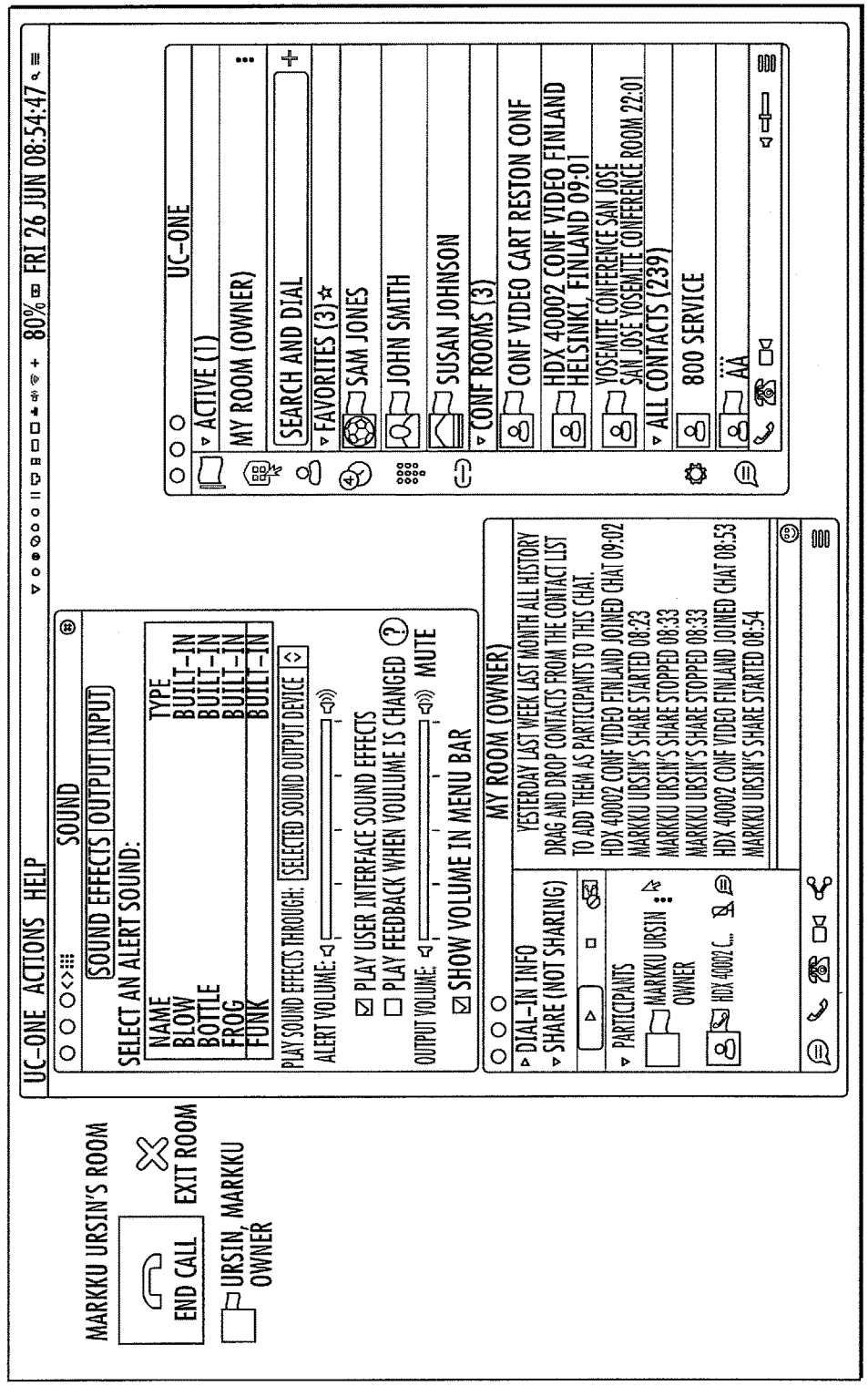
FIG. 4C is a drawing of a computer screen shot illustrating an interface provided by the meeting room application instance after the host has initiated screen sharing in the virtual conference room.

In FIG. 4C, meeting room application 112 displays a screen sharing session automatically initiated by the conference host. Again, the invitees are not required to interact with meeting room application 112 in order to view the interface illustrated in FIG. 4C.

Figure 4D:
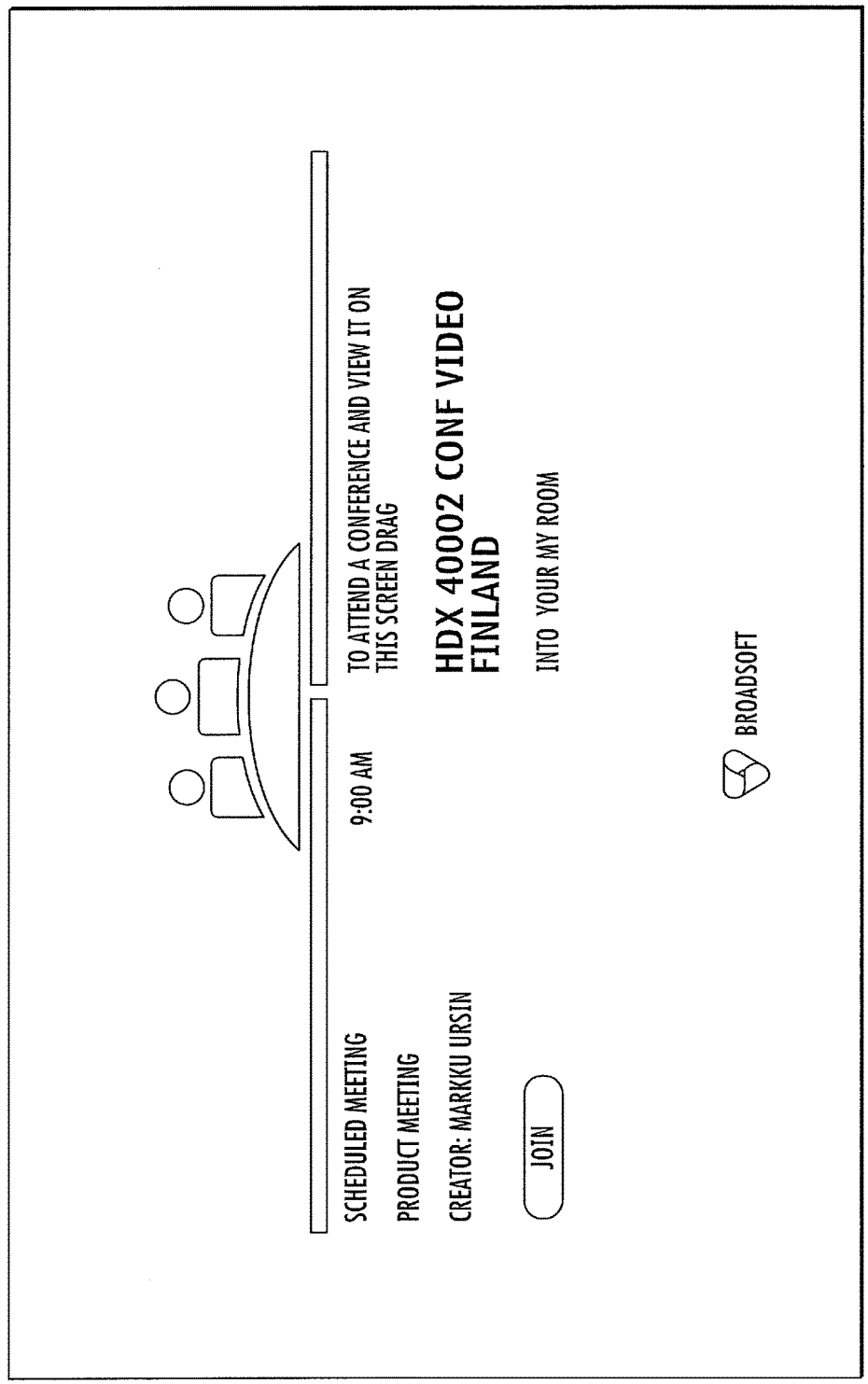
FIG. 4D is a drawing of a computer screen shot illustrating an interface provided by the meeting room application instance to join a scheduled meeting in a host's virtual conference room.
Figure 4E:
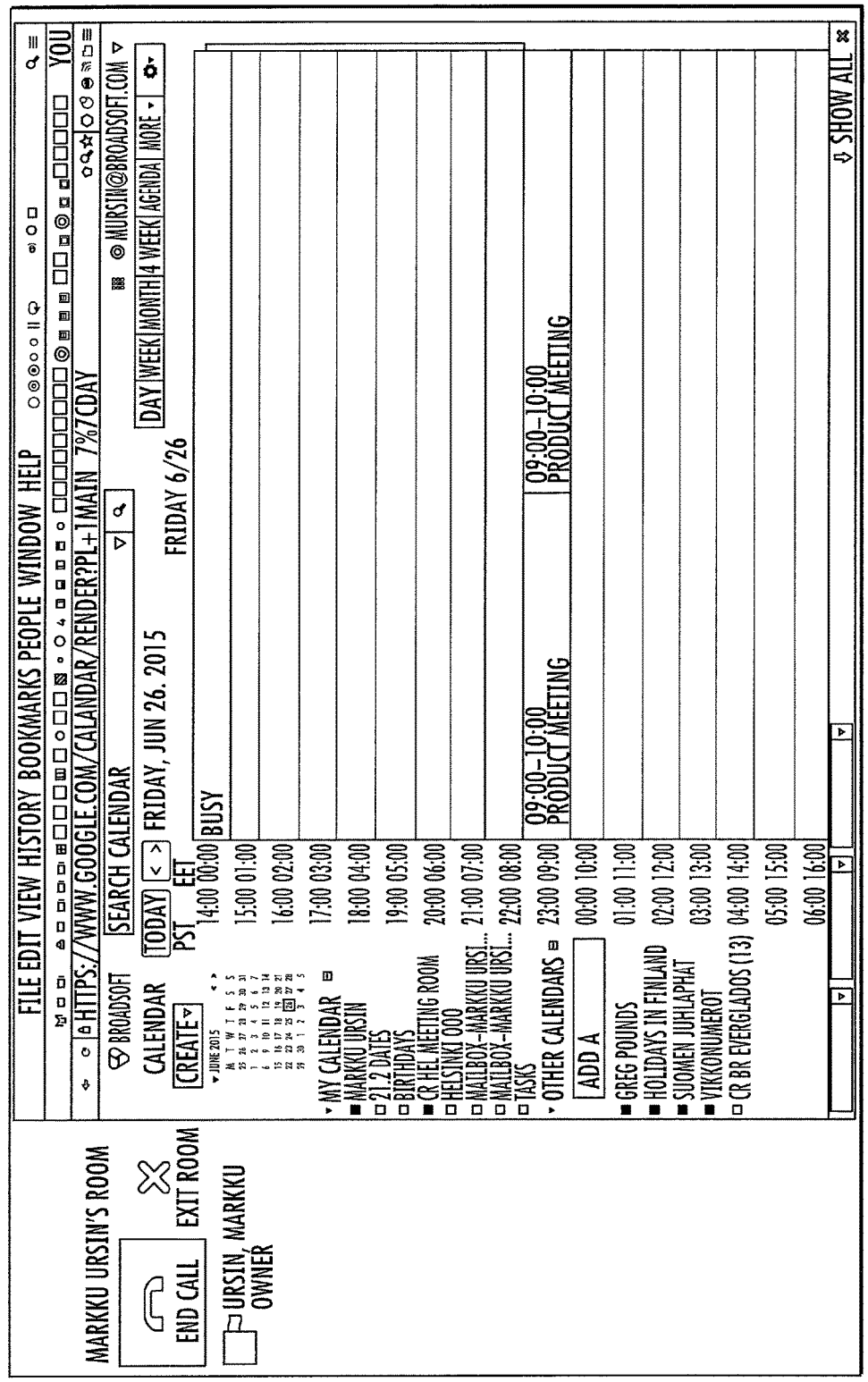
FIG. 4E is a drawing of a computer screen shot illustrating an interface provided by the meeting room application instance after the participant has joined a scheduled meeting.

According to another aspect of the subject matter described herein, conference invitees may interact with meeting room application 112 to join scheduled conferences on a calendar interface, such as GOOGLE CALENDAR. In one example, meeting room application 112 reads the conference information about the scheduled meeting from the physical conference room's reservation calendar, e.g. as set forth on a GOOGLE, OUTLOOK, or other calendaring system. To benefit from this feature, the host doesn't need to do anything more than what he's already doing when booking a physical meeting room for his meeting. For example, the host may initiate a meeting involving the physical conference room by adding an entry to the calendaring system of the physical conference room. Meeting room application 112 may periodically access the physical conference room calendaring system and automatically display the screen illustrated in FIG. 4C at the scheduled meeting time. In FIG. 4D, the meeting room participants may select the join button, which automatically initiates signaling with the media servers to join the prescheduled conference. FIG. 4E illustrates the interface that may be provided by meeting room application 112 after a user has automatically joined a scheduled conference.

Figure 5:
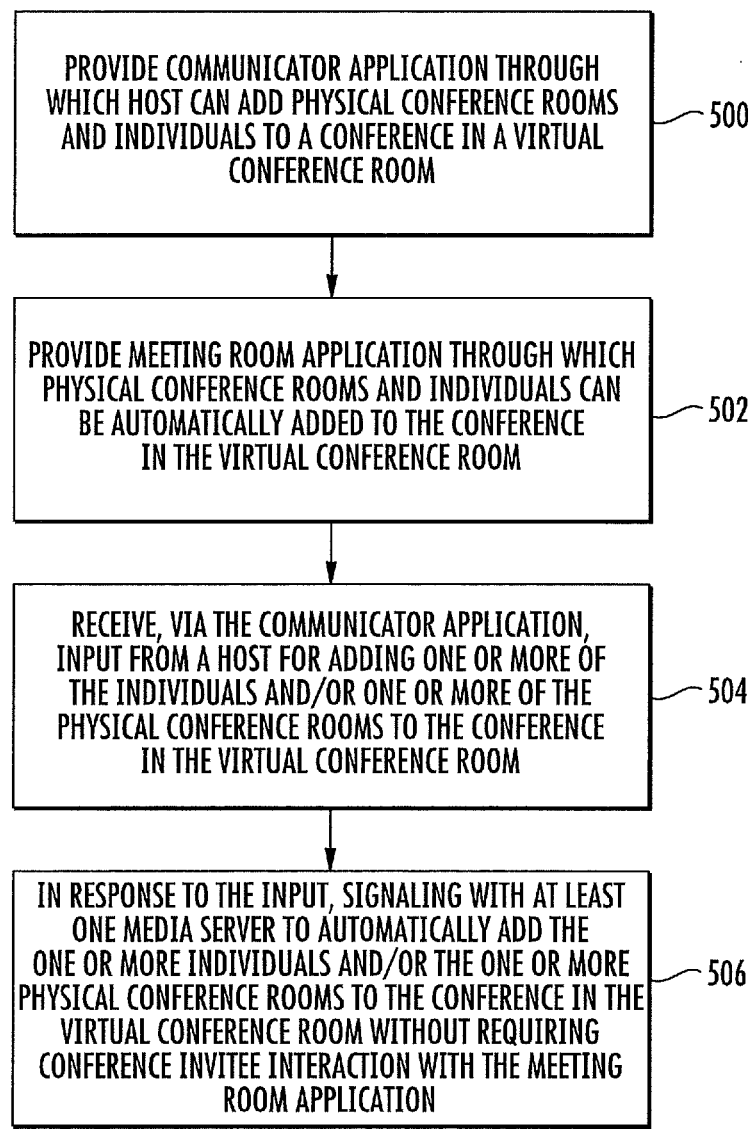
FIG. 5 is a flow chart illustrating an exemplary process for automatically adding individuals and physical conference rooms to a conference in a virtual conference room according to an embodiment of the subject matter described herein.

FIG. 5 is a flow chart illustrating an exemplary process for automatically adding individuals and physical conference rooms to a conference in a virtual conference room according to an embodiment of the subject matter described herein. Referring to FIG. 5, in step 500, a communicator application is provided through which a host can add a physical conference room to a conference in a virtual conference room. For example, communicator application 100 may be provided that allows a host, using the interfaces illustrated in FIGS. 3A-3E above to add physical conference rooms to conferences.

In step 502, a meeting room application is provided through which an individual or a physical conference room can be automatically added to a conference in a virtual conference room. For example, meeting room application 112 may provide the interfaces illustrated in FIGS. 4A-4E that allow physical conference rooms to be automatically added to conferences. As stated above, a meeting room application instance may be provided for each individual and physical conference room for which it is desirable to have automatic conference joining capability.

In step 504, input from a host is received via the communicator application for adding one or more individuals and/or one or more physical conference room to a conference in a virtual conference room. For example, the host of a conference may interact with communicator application 100 to invite one or more physical conference rooms and/or individuals from the host's contacts to a conference.

In step 506, in response to the input, signaling is initiated with at least one media server to automatically add the one or more individuals and/or one or more physical conference rooms to the conference in the virtual conference room without requiring conference invitee interaction with the meeting room application. For example, individuals and/or physical conference rooms may be automatically joined to a conference in a host user's virtual conference room without requiring the invitees to interact with their respective meeting room application instances 112.

Thus, according to the subject matter described herein, multimedia conferencing is improved by reducing the complexity and number of steps required for invitees to join multimedia conferencing. A computing platform that executes meeting room application 112 and/or communicator application 100 may be considered a special purpose computing platform that is programmed to facilitate multimedia conference joining and control. Computers programmed with communicator application 100 and/or meeting room application 112 improve the technological field of multimedia conferencing over a packet-based network by reducing the labor required to join a conference and also reducing the possibility of failing to join a conference.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for automatically adding individuals and physical conference rooms to conferences in virtual conference rooms, the method comprising:
   providing a communicator application through which a host can add individuals and physical conference rooms to a conference in a virtual conference room, wherein the communicator application provides a graphical user interface including a graphical representation of the virtual conference room and wherein the graphical user interface allows the host to invite others into the virtual conference room by dragging and dropping contacts from a contact list of the host into the graphical representation of the virtual conference room;
   providing a plurality of meeting room application instances through which the individuals and the physical conference rooms can be automatically joined to the conference;
   receiving, via the communicator application, input from the host to invite one or more of the individuals and/or one or more of the physical conference rooms to the conference, wherein the one or more of the individuals and/or one or more of the physical conference rooms include at least two invitees located remotely from each other and utilizing separate conference room hardware executing separate meeting room application instances and wherein receiving the input includes receiving the input in response to the host dragging contacts from the contact list into the graphical representation of the virtual conference room;
   signaling, via one or more media servers, to automatically join the one or more individuals and/or the one or more physical conference rooms including the at least two invitees to the conference; and
   in response to the input received from the host via the communicator application to invite the one or more of the individuals and/or the one or more physical conference rooms including the at least two invitees to the conference, automatically, without the one or more individuals including the at least two invitees having to accept the conference or otherwise interact with their respective meeting room application instances, adding the one or more individuals and/or the one or more physical conference rooms including the at least two invitees to the conference.

2. The method of claim 1 wherein the contacts include the individuals and the physical conference rooms.

3. The method of claim 1 wherein the communicator application displays a list of participants in the conference after being added by the host.

4. The method of claim 1 wherein the communicator application provides a sharing button for initiating a screen sharing session between the host and the one or more individuals and/or the one or more physical conference rooms including the at least two invitees.

5. The method of claim 1 wherein the meeting room application instances automatically signal with the one or more media servers to add the one or more individuals and/or physical conference rooms including the at least two invitees to the conference.

6. The method of claim 1 wherein the meeting room application instances automatically signal with the one or more media servers to initiate voice and/or a screen sharing session via the virtual conference room.

7. The method of claim 1 wherein the meeting room application instances each include a join button for allowing the one or more individuals and/or physical conference rooms including the at least two invitees to join a scheduled conference.

8. The method of claim 1 wherein the meeting room application instances are configured to read conference entries of a calendaring system of a physical conference room and automatically invites the physical conference room to join the conference at times based on the entries.

9. A system for automatically adding individuals and physical conference rooms to conferences in virtual conference rooms, the system comprising:
   a host computing platform including at least one processor;
   a communicator application executable by the host computing platforms and through which a host can add individuals and physical conference rooms to a conference in a virtual conference room, wherein the communicator application provides a graphical user interface including a graphical representation of the virtual conference room and wherein the graphical user interface allows the host to invite others into the virtual conference room by dragging and dropping contacts from a contact list of the host into the graphical representation of the virtual conference room;
   a plurality of conference room invitee computing platform platforms, each including at least one processor; and
   a plurality of meeting room application instances executable by the conference room invitee computing platform and through which an individual or a physical conference room can be automatically joined to the conference;
   wherein the communicator application receives input from the host to invite one or of the individuals and/or physical conference rooms to the conference, wherein the one or more of the individuals and/or one or more of the physical conference rooms include at least two invitees located remotely from each other and utilizing separate conference room invitee computing platforms executing separate meeting room application instances and wherein receiving the input includes receiving the input in response to the host dragging contacts from the contact list into the graphical representation of the virtual conference room, wherein the communicator application signals, via one or more media servers, to automatically join the one or more individuals and/or the one or more physical conference rooms to the conference and in response to the input received from the host via the communicator application to invite the one or more of the individuals and/or the one or more physical conference rooms including the at least two invitees to the conference, automatically, without the one or more individuals including the at least two invitees having to accept the conference or otherwise interact with their respective meeting room application instances, adds the one or more individuals and/or physical conference rooms including the at least two invitees to the conference.

10. The system of claim 9 wherein the communicator application displays a list of participants in the conference after being added by the host.

11. The system of claim 9 wherein the communicator application provides a sharing button for initiating a screen sharing session with the one or more individuals and/or physical conference rooms including the at least two invitees.

12. The system of claim 9 wherein the meeting room application instances automatically signal with the one or more media servers to add the one or more individuals and/or physical conference rooms including the at least two invitees to the conference.

13. The system of claim 9 wherein the meeting room application instances automatically signal with the one or more media servers to initiate a voice and/or a screen sharing session via the virtual conference room.

14. The system of claim 9 wherein the meeting room application instances each include a join button for allowing the one or more individuals and/or physical conference rooms including the at least two invitees to join a scheduled conference.

15. The system of claim 9 wherein the meeting room application instances each read conference entries of a calendaring system of a physical conference room and automatically invites the one or more individuals and/or physical conference rooms including the at least two invitees to join the conference at times based on the entries.

16. A non-transitory computer readable medium having stored thereon executable instructions that when executed by the processor of a computer control the computer to perform steps comprising:

providing a communicator application through which a host can invite individuals and physical conference rooms to a conference in a virtual conference room, wherein the communicator application provides a graphical user interface including a graphical representation of the virtual conference room and wherein the graphical user interface allows the host to invite others into the virtual conference room by dragging and dropping contacts from a contact list of the host into the graphical representation of the virtual conference room;

providing a plurality of meeting room application instances through which the individuals and the physical conference rooms can be automatically joined to the conference;

receiving, via the communicator application, input from the host to invite one or more of the individuals and/or one or more of the physical conference rooms to the conference, wherein the one or more of the individuals and/or one or more of the physical conference rooms include at least two invitees located remotely from each other and utilizing separate conference room hardware executing separate meeting room application instances and wherein receiving the input includes receiving the input in response to the host dragging contacts from the contact list into the graphical representation of the virtual conference room;

signaling, via one or more media servers, to automatically join the one or more individuals and/or the one or more physical conference rooms including the at least two invitees to the conference; and in response to the input received from the host via the communicator application to invite the one or more of the individuals and/or the one or more physical conference rooms including the at least two invitees to the conference, automatically, without the one or more individuals including the at least two invitees having to accept the conference or otherwise interact with their respective meeting room application instances, adding the one or more individuals and/or the one or more physical conference rooms including the at least two invitees to the conference.

* * * * *